US009550410B2

(12) United States Patent
Katsura (10) Patent No.: US 9,550,410 B2
(45) Date of Patent: Jan. 24, 2017

(54) SUNROOF APPARATUS (71) Applicant: AISIN SEIKI KABUSHIKI KAISHA, Kariya-shi, Aichi-ken (JP)

(72) Inventor: Shintaro Katsura, Novi, MI (US)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 14/802,981

(22) Filed: Jul. 17, 2015

(65) Prior Publication Data
US 2016/0031303 A1 Feb. 4, 2016

(30) Foreign Application Priority Data

Jul. 31, 2014 (JP) .................................. 2014-156640

(51) Int. Cl.
*B60J 7/057* (2006.01)
*B60J 7/043* (2006.01)

(52) U.S. Cl.
CPC .............. *B60J 7/043* (2013.01); *B60J 7/0435* (2013.01); *B60J 7/0573* (2013.01)

(58) Field of Classification Search
CPC .......... B60J 7/043; B60J 7/0435; B60J 7/0573
USPC ................. 296/216.02–216.05, 223, 216.08
See application file for complete search history.

(56) References Cited

U.S. PATENT DOCUMENTS

| | | | |
|---|---|---|---|
| 6,325,453 B1 * | 12/2001 | Manders | B60J 7/022 296/223 |
| 6,343,833 B1 * | 2/2002 | Manders | B60J 7/022 296/221 |
| 6,390,544 B1 * | 5/2002 | Manders | B60J 7/0435 296/221 |
| 6,394,540 B1 * | 5/2002 | Manders | B60J 7/02 296/216.08 |
| 6,419,310 B1 * | 7/2002 | Manders | B60J 7/05 296/221 |
| 6,890,025 B2 * | 5/2005 | Hanke | B60J 7/02 296/216.08 |
| 7,644,980 B2 * | 1/2010 | Hager | B60J 7/02 296/221 |
| 7,950,733 B2 * | 5/2011 | Farber | B60J 7/05 296/221 |
| 8,500,193 B2 * | 8/2013 | Faerber | 296/221 |
| 8,882,187 B2 | 11/2014 | Katsura et al. | |
| 2009/0021056 A1 * | 1/2009 | Manders | B60J 7/05 296/221 |

(Continued)

FOREIGN PATENT DOCUMENTS

JP 2013-184648 A 9/2013

*Primary Examiner* — Dennis H Pedder
(74) *Attorney, Agent, or Firm* — Finnegan, Henderson, Farabow, Garrett & Dunner, LLP (57) ABSTRACT

A sunroof apparatus includes: a movable panel that can open or close an opening formed in a roof of a vehicle; guide rails having a pair of rail-side holding portions provided side by side in a lateral direction, and respectively provided in both edge portions of the opening in the lateral direction; support brackets, front end portions of which are supported by the guide rails, having vertical walls, and each of which has bracket-side held portions; sliding members are provided so as to be able to move along the guide rails, and each of which has a connection wall; sliding member-side held portions, and sliding member-side holding portions; and an electric driving source driving the movement of the sliding members.

2 Claims, 6 Drawing Sheets

(56) References Cited

U.S. PATENT DOCUMENTS

2011/0080023 A1* 4/2011 Geurts ................... B60J 7/024
                                                    296/216.05
2012/0068501 A1* 3/2012 Faerber ................... B60J 7/05
                                                    296/216.02

* cited by examiner

SUNROOF APPARATUS

CROSS REFERENCE TO RELATED APPLICATIONS

This application is based on and claims priority under 35 U.S.C. §119 to Japanese Patent Application 2014-156640, filed on Jul. 31, 2014, the entire contents of which are incorporated herein by reference.

TECHNICAL FIELD

This disclosure relates to a sunroof apparatus.

BACKGROUND DISCUSSION

In the related art, JP 2013-184648A (Reference 1) discloses a sunroof apparatus. This sunroof apparatus includes a movable panel which can open or close an opening formed in the roof of a vehicle; guide rails which are respectively provided in both edge portions of the opening in a lateral direction of the vehicle; support brackets, front end portions of which are supported by the guide rails, and which support both edge portions of the movable panel in the lateral direction of the vehicle; and sliding members which are provided so as to be able to move along the guide rails, and are connected to the support brackets. An electric driving source drives the movement of the sliding members. Along with the movement of the sliding members, in a fully closed state of the movable panel, when the support brackets pivotally turn relative to front and portions of the support brackets such that rear ends of the support brackets are raised, the movable panel is tilted upward, and when the front end portions continuously move to the rear of the vehicle, the movable panel slides while being tilted upward.

A substantially U-shaped holding groove is formed in each of the sliding members in such a manner that the holding groove opens toward the rear of the vehicle. A substantially circular column-shaped holding pin is fixedly attached to each of the support brackets in such a manner that the holding pin protrudes toward the inside of the vehicle in the lateral direction of the vehicle. Since the holding pins are engageably inserted into the holding grooves when the movable panel is in a fully closed state, even if a load is applied to the movable panel from a vehicle's passenger compartment (from below the movable panel), for example, when the head of a passenger comes into contact with the movable panel, the support brackets are prevented from being twisted in a certain direction, and both the support brackets are in more stable positions due to the movable panel.

In the sunroof apparatus disclosed in Reference 1, for example, when a large load is applied to the fully closed movable panel from the vehicle's passenger compartment due to a vehicle rolling over, both the support brackets may be twisted in a reverse direction, and may be in unstable positions.

SUMMARY

Thus, a need exists for a sunroof apparatus which is not suspectable to the drawback mentioned above.

An aspect of the disclosure is directed to a sunroof apparatus including: a movable panel that can open or close an opening formed in a roof of a vehicle; guide rails that have a pair of rail-side holding portions provided side by side in a lateral direction of the vehicle, and are respectively provided in both edge portions of the opening in the lateral direction of the vehicle; support brackets, front end portions of which are supported by the guide rails, which have vertical walls for supporting both edge portions of the movable panel in the lateral direction of the vehicle, and each of which has a pair of bracket-side held portions provided on both sides of a rear end portion of the vertical wall in the lateral direction of the vehicle; sliding members which are provided so as to be able to move along the guide rails, and each of which has a connection wall connected to the support bracket; a pair of sliding member-side held portions that is provided on both sides of the connection wall in the lateral direction of the vehicle, and is held by both the rail-side holding portions such that both the sliding member-side held portions cannot move in the lateral direction and a vertical direction of the vehicle; and a pair of sliding member-side holding portions that is provided side by side in a rear end portion of the connection wall in the lateral direction of the vehicle, and holds both the bracket-side held portions such that both the bracket-side held portions cannot move in the lateral direction and the vertical direction of the vehicle when the movable panel is in a fully closed state; and an electric driving source that drives the movement of the sliding members.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment of a sunroof apparatus will be described. In the following description, a "longitudinal direction" refers to a longitudinal direction of a vehicle, and an "upper side" and a "lower side" refer to the upper side and the lower side of the vehicle in a vertical direction of the vehicle, respectively. An inside, facing a vehicle's passenger compartment, in a lateral direction of the vehicle refers to the "inside of the vehicle", and an outside, facing the outside of the vehicle's passenger compartment, in the lateral direction of the vehicle refers to the "outside of the vehicle".

Figure 1:
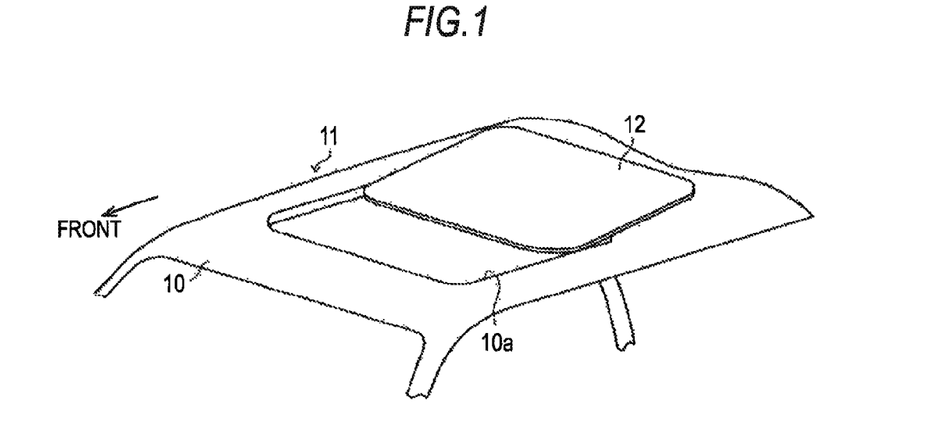
FIG. 1 is a perspective view when a roof is obliquely seen from the top.

As illustrated in FIG. 1, a substantially rectangular opening 10a is formed in a roof 10 of a vehicle such as an automobile, and a sunroof apparatus 11 is mounted on the roof 10. The sunroof apparatus 11 includes a substantially rectangular movable panel 12 made of a glass plate or the like, which moves in the longitudinal direction to open or close the opening 10a.

The movable panel 12 is attached in such a manner that a rear portion of the movable panel 12 can be pivotally tilted upward relative to a front portion of the movable panel 12, and the movable panel 12 can slide in the longitudinal direction. The movable panel 12 opens and closes the opening 10a using a so-called outer sliding method in which the movable panel 12 slides while being tilted upward.

Subsequently, the structure of the sunroof apparatus 11 is described in conjunction with an opening and closing operation performed by the movable panel 12.

Figure 2:
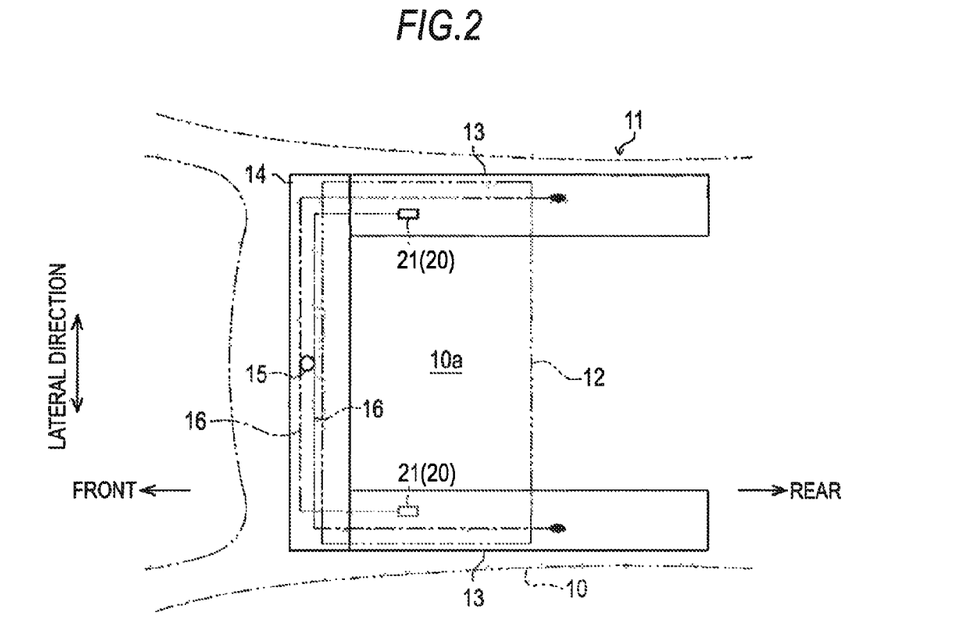
FIG. 2 is a plan view illustrating an embodiment.

As illustrated in FIG. 2, a pair of guide rails 13 is provided in both edge portions of the opening 10a in the lateral direction of the vehicle. For example, the guide rail 13 is made of an extruded aluminum alloy material, and the guide rail 13 with a uniform longitudinal section extends in the longitudinal direction. Each of the guide rail 13 guides and supports a functional component 20 in such a manner that the functional component 20 can move in the longitudinal direction. The movable panel 12 is connected to and is supported by both the functional components 20 while being suspended therebetween. When both the functional components 20 move along the guide rails 13 in the longitudinal direction, the movable panel 12 is tilted upward or slides along the guide rails 13.

Front ends of both the guide rails 13 are connected to each other via a front housing 14 that extends in the lateral direction of the vehicle. An electric driving source 15 such as a motor with an output gear is installed in a longitudinal intermediate portion of the front housing 14. The electric driving source 15 is connected to both the functional components 20 via a pair of substantially belt-like driving belts 16 made of a resin material or the like, and simultaneously moves both the functional components 20 in the longitudinal direction.

Figure 7:
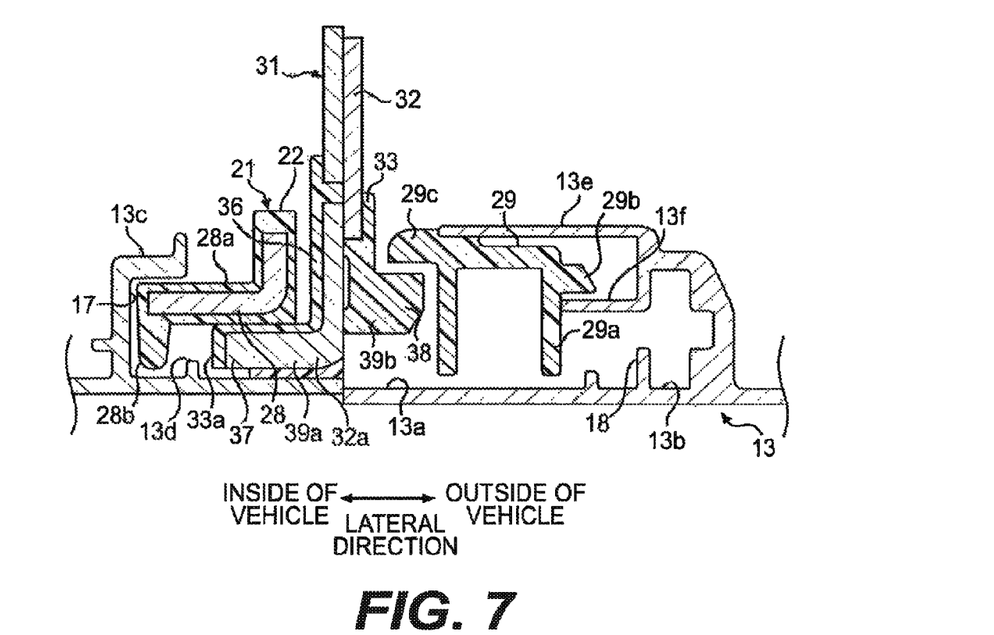
FIG. 7 is a sectional view taken along line 7-7 in FIG. 5.

As illustrated in FIG. 7, each of the guide rails 13 includes a first rail portion 13a which is formed in a substantially U-shaped section, and opens upward, and a second rail portion 13b which is formed adjacent to a lateral outside portion of the first rail portion 13a. The second rail portion 13b along with a side wall of the first rail portion 13a forms a substantially T-shaped section, and the second rail portion 13b communicates with the first rail portion 13a via an opening formed in the side wall.

Each of the guide rails 13 includes a flange 13c which extends toward the outside of the vehicle from an lateral internal and upper end of the first rail portion 13a, and a substantially stripe-shaped rib 13d which protrudes upward from a portion of the first rail portion 13a, the portion being positioned below a lateral external end (distal end) of the flange 13c. Along with a lateral internal portion of the first rail portion 13a positioned below the flange 13c, and the rib 13d, the flange 13c forms a first rail-side holding portion 17 as a rail-side holding portion with a substantially C-shaped section, which opens toward the outside of the vehicle. Each of the guide rails 13 includes an upper flange 13e and an intermediate flange 13f, both of which extend toward the inside of the vehicle from portions of the second rail portion 13b positioned above a lateral external end of the first rail portion 13a. The upper flange 13e and the intermediate flange 13f are formed separate from each other in the vertical direction of the vehicle. The intermediate flange 13f along with a lateral external portion of the first rail portion 13a forms a second rail-side holding portion 18 as a rail-side holding portion with a substantially U-shaped section, which opens toward the inside of the vehicle, with the lateral external portion being positioned below the intermediate flange 13f. That is, the first rail-side holding portion 17 and the second rail-side holding portion 18 are provided side by side in the lateral direction of the vehicle while the openings of the first rail-side holding portion 17 and the second rail-side holding portion 18 face each other.

Figure 3:
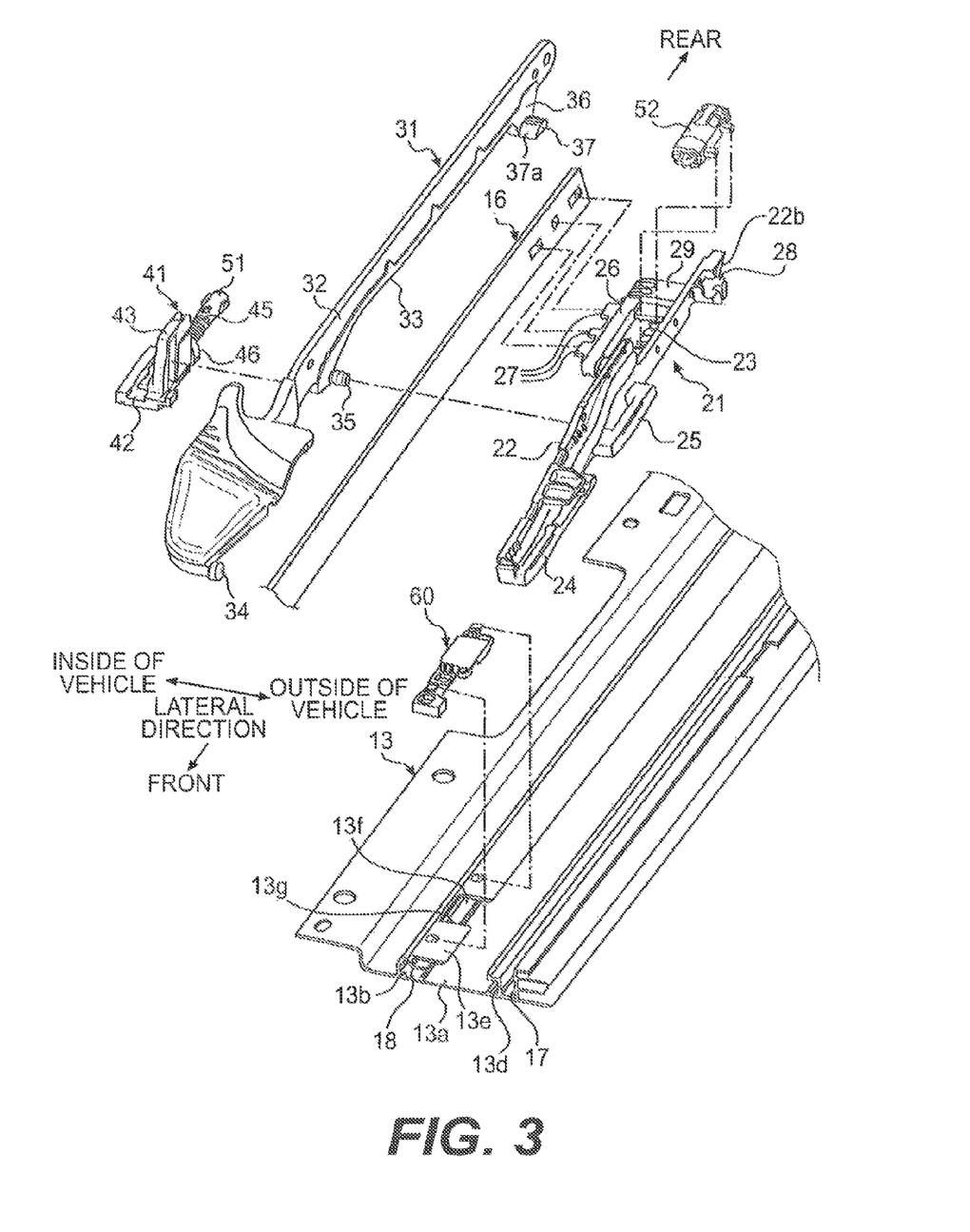
FIG. 3 is an exploded perspective view illustrating the embodiment.

As illustrated in FIG. 3, the upper flange 13e includes a substantially rectangular cut-out portion 13g formed at a predetermined position close to the front of the vehicle. A guide block 60 is fixed to the guide rail 13 in such a manner that the guide block 60 is placed on the intermediate flange 13f, and is fitted into the upper flange 13e at the cut-out portion 13g.

A driving shoe 21 is mounted on the guide rail 13 (the first rail portion 13a) in such a manner as to be able to move in the longitudinal direction, and is a sliding member in which metal plates, resin, and the like are integrated together. That is, the driving shoe 21 includes a vertical wall portion 22 which is erected as a connection wall over the substantially entire longitudinal length of the driving shoe 21, and a protruding wall portion 23 which protrudes a substantially predetermined distance toward the outside of the vehicle from a lower end portion of the vertical wall portion 22 over the substantially entire longitudinal length thereof. The driving shoe 21 includes a front shoe portion 24 and an intermediate shoe portion 25 as sliding member-side held portions which protrude toward the inside of the vehicle from a front lower end and a longitudinal intermediate lower end of the vertical wall portion 22, respectively, and a rear shoe portion 26 as a sliding member-side held portion which protrudes toward the outside of the vehicle from a rear end of the protruding wall portion 23.

The front shoe portion 24 and the intermediate shoe portion 25 are fitted into the first rail-side holding portion 17 in such a manner as to be able to move in the longitudinal direction, and since the front shoe portion 24 and the intermediate shoe portion 25 are in contact with, or are positioned close to the first rail-side holding portion 17, the front shoe portion 24 and the intermediate shoe portion 25 are held in such a manner as not to be able to move toward the inside of the vehicle and in the vertical direction of the vehicle. Similarly, the rear shoe portion 26 is fitted into the second rail-side holding portion 18 in such a manner as to be able to move in the longitudinal direction, and since the rear shoe portion 26 is in contact with, or is positioned close to the second rail-side holding portion 18, the rear shoe portion 26 is held in such a manner as not to be able to move toward the outside of the vehicle and in the vertical direction of the vehicle. As such, the driving shoe 21 can move in the longitudinal direction in a state where the first rail portion 13a holds the driving shoe 21 such that the driving shoe 21 cannot move in the lateral direction and the vertical direction of the vehicle.

A rear end surface of the vertical wall portion 22 forms a sliding member-side guide surface 22b that is inclined downward toward the front of the vehicle.

The driving shoe 21 includes a plurality (three) of extending pieces 27 which protrude toward the outside of the vehicle from the rear shoe portion 26, and enter the second rail portion 13b. The extending pieces 27 are connected to the driving belt 16 that slides along the second rail portion 13b in the longitudinal direction. When the electric driving source 15 moves the driving belt 16 along the guide rail 13 (the second rail portion 13b) in the longitudinal direction, the driving shoe 21 moves along the first rail portion 13a in the longitudinal direction.

The driving shoe 21 further includes a first sliding member-side holding portion 28 as a sliding member-side holding portion which protrudes toward the inside of the vehicle from a rear end of the vertical wall portion 22, and a second sliding member-side holding portion 29 as a substantially T-shaped sliding member-side holding portion which is connected to a rear end of the rear shoe portion 26, and protrudes upward more than the rear shoe portion 26.

Figure 6A:
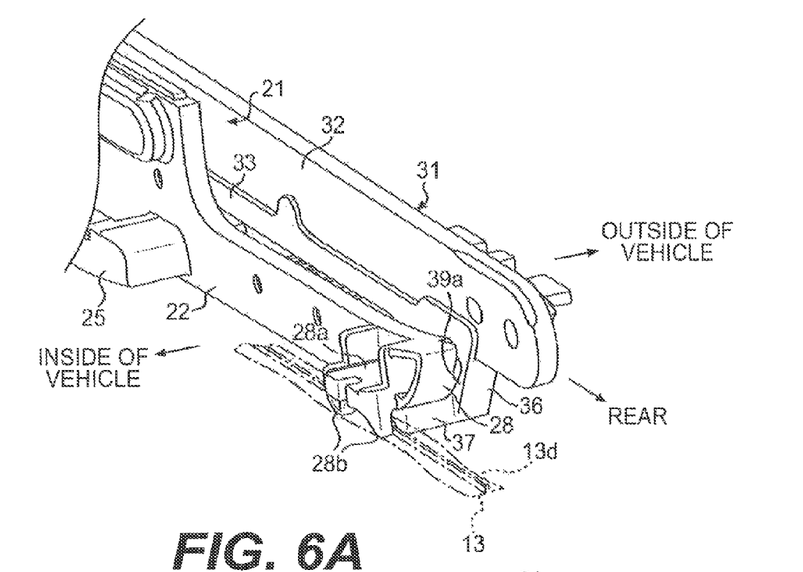
FIGS. 6A and 6B are perspective views in the embodiment when a vehicle is seen from a rear top side.
Figure 6B:
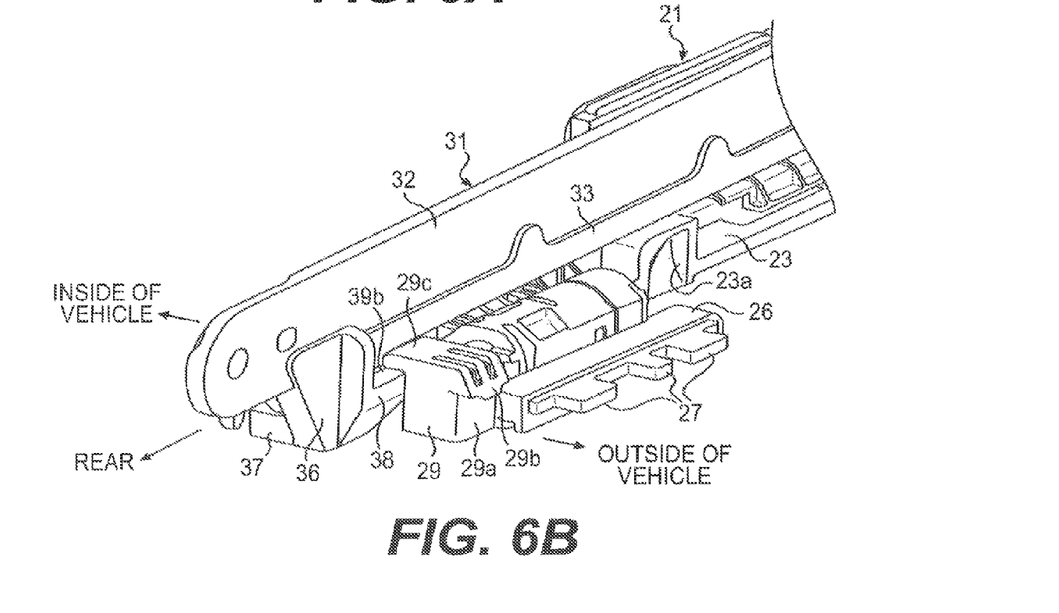

As illustrated in FIGS. 6A, 6B, and 7, the first sliding member-side holding portion 28 includes an extending piece 28a which substantially horizontally extends toward the inside of the vehicle along the lower surface of the flange 13c, and is in contact with, or is positioned close to the first rail-side holding portion 17, and a pair of front and rear restricting pieces 28b with a substantially triangular claw shape, which extends downward from a lateral internal and of the extending piece 28a. Both the restricting pieces 28b are positioned farther inside of the rib 13d of the guide rail 13. In contrast, the second sliding member-side holding portion 29 includes a substantially rectangular body portion 29a that is in contact with, or is positioned close to the lower surface of the upper flange 13e and a lateral internal end (distal end) of the intermediate flange 13f. The second sliding member-side holding portion 29 includes a substantially visor-like extending piece 29b, which extends to the outside of the vehicle from an upper end portion of the body portion 29a, and is in contact with or is positioned close to the upper surface of the intermediate flange 13f, and a substantially visor-like extending piece 29c which extends toward the inside of the vehicle from an upper end of the body portion 29a. The extending piece 29c is positioned farther outside of the protruding wall portion 23.

Figure 4A:
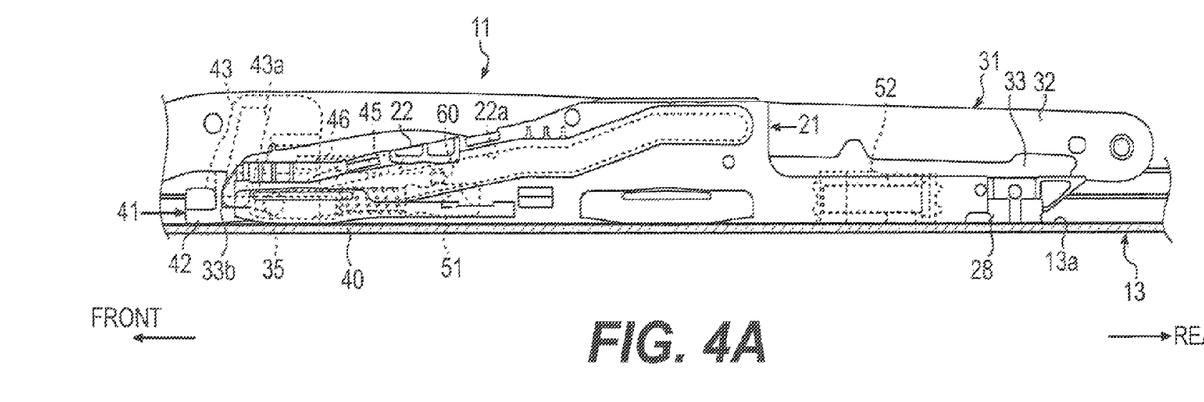
FIG. 4A is a side view illustrating a fully closed state of a movable panel.
Figure 4B:
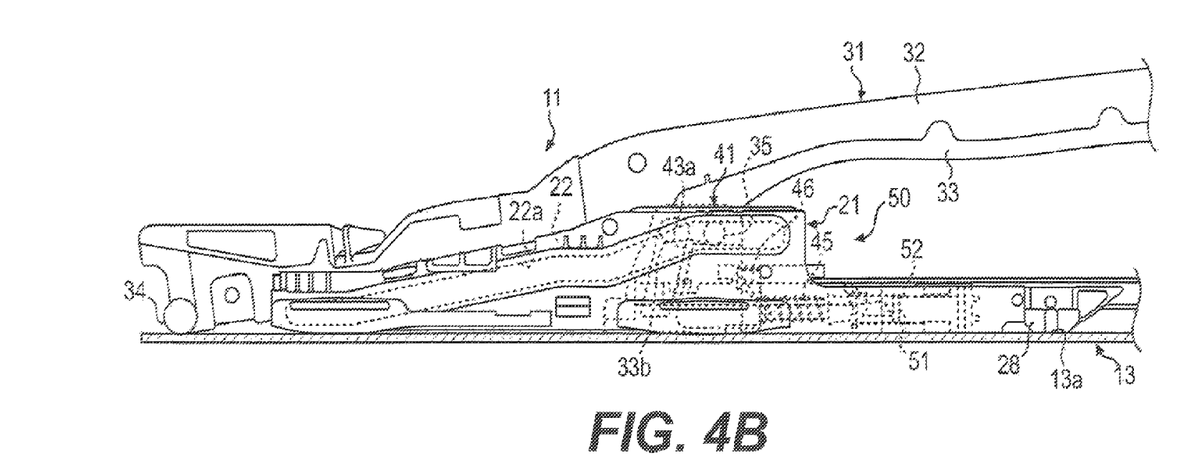
FIG. 4B is a side view of a second tilted up state of the movable panel.
Figure 5:
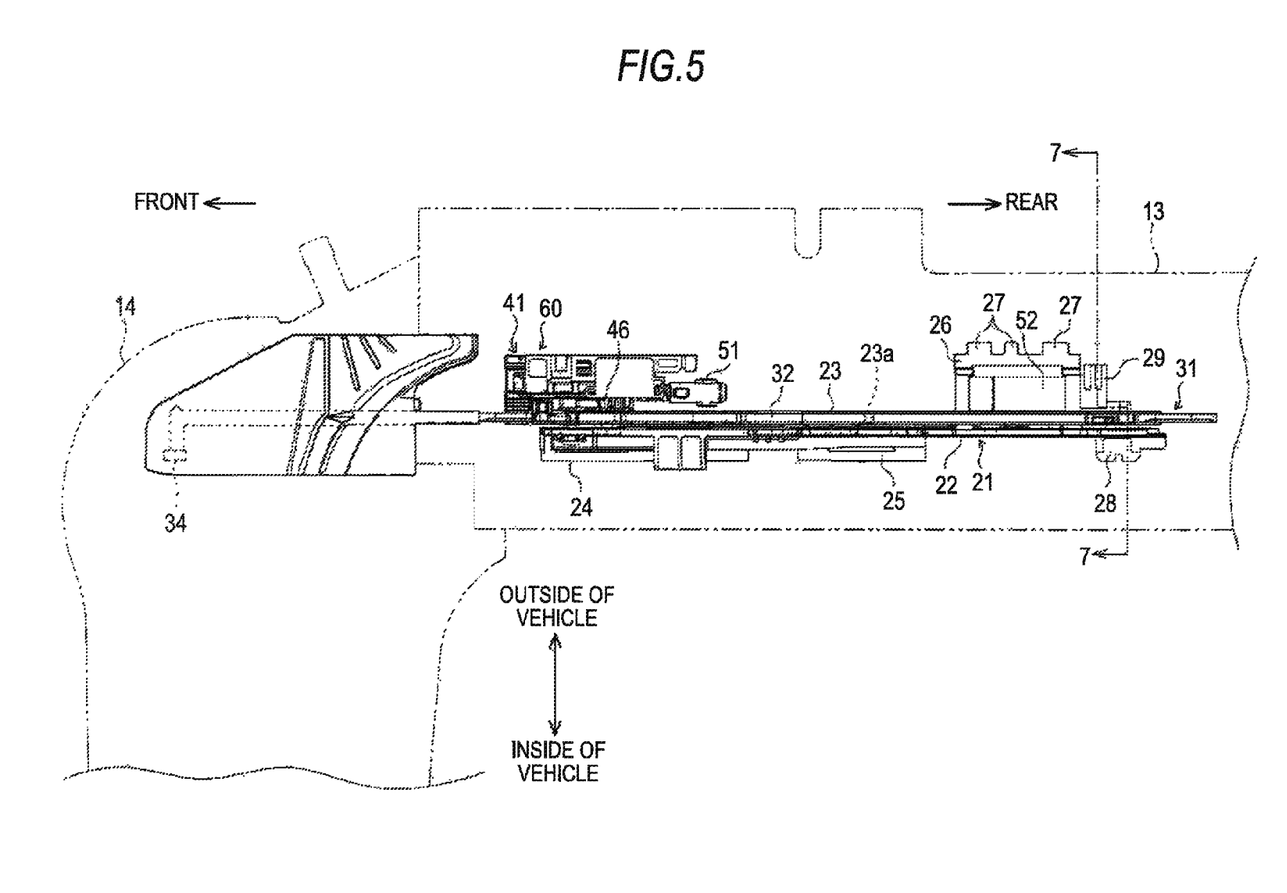
FIG. 5 is a plan view illustrating the embodiment.

As illustrated in FIGS. 4A and 4B, the vertical wall portion 22 includes a guide groove 22a which is concave toward the inside of the vehicle from the lateral external end surface of the vertical wall portion 22, and extends in the longitudinal direction. Basically, the guide groove 22a is inclined upward toward the rear of the vehicle. As illustrated in FIG. 5, an engageable insertion concave portion 23a is formed in a longitudinal intermediate portion of the protruding wall portion 23 positioned further in front of the rear shoe portion 26, and the engageable insertion concave portion 23a is concave toward the inside of the vehicle from the lateral external and surface of the protruding wall portion 23.

As illustrated in FIG. 3, support brackets 31 extending in the longitudinal direction are fixedly attached to edge portions of the lower surface of the movable panel 12 in the lateral direction. The support bracket 31 extends over the substantially entire length of the movable panel 12, and includes a vertical wall portion 32 made of a metal plate as a vertical wall which is perpendicularly provided on the lower surface of the movable panel 12, and a molding portion 33 made of resin in which a lower edge portion of the vertical wall portion 32 is mainly buried.

As illustrated in FIG. 5, basically, the support bracket 31 is disposed on the protruding wall portion 23 of the driving shoe 21, and outside of the vertical wall portion 22 in the lateral direction. A substantially circular column-shaped driven shoe 34 is formed at a front end of the support bracket 31. The driven shoe 34 is mounted and supported in front of the driving shoe 21 in the vehicle in such a manner that the driven shoe 34 can move relative to the first rail portion 13a of the guide rail 13 in the longitudinal direction. When the support brackets 31 pivotally turn relative to front portions (the driven shoes 34) of the support brackets 31 such that rear portions of the support brackets 31 are raised, the movable panel 12 is tilted upward, and when the support brackets 31 pivotally turn relative to the front portions such that the rear portions are lowered, the movable panel 12 is tilted downward. The functional component 20 is made up of the driving shoe 21 and the driven shoe 34.

As illustrated in FIG. 4A, a substantially circular column-shaped elevating guide pin 35 is provided integrally with a front end portion of the molding portion 33, protrudes toward the inside of the vehicle, and is movably inserted into the guide groove 22a. The elevating guide pin 35 is set to be disposed at a lower end of the guide groove 22a when the movable panel 12 is fully closed. Accordingly, in this state, when the driving shoe 21 moves a predetermined distance relative to the support bracket 31 toward the front of the vehicle, the elevating guide pin 35 moves upward along the guide groove 22a, and reaches an intermediate portion of the guide groove 22a. At this time, the support brackets 31 pivotally turn relative to the front portions such that the rear portions are raised, and thus the movable panel 12 is tilted upward (first tilted up state).

Subsequently, when the driving shoe 21 moves further toward the front of the vehicle, as illustrated in FIG. 4B, the elevating guide pin 35 moves further upward along the guide groove 22a, and reaches a dead end of the guide groove 22a. At this time, when the support brackets 31 pivotally turn more relative to the front portions such that the rear portions are further raised, the movable panel 12 is tilted further upward (second tilted up state).

As illustrated in FIGS. 6A and 6B, and 7, a rear end portion of the support bracket 31 is provided with a substantially trapezoidal plate-like extending piece 36 which extends downward; a first substantially flat plate-like engaging piece 37 which protrudes toward the inside of the vehicle from a lower end of the extending piece 36; and a second substantially L-shaped engaging piece 38 which protrudes toward the outside of the vehicle from the extending piece 36. The extending piece 36 and the first engaging piece 37 are formed as a substantially L-shaped extending piece 32a which extends from the vertical wall portion 32 made of metal along the extending piece 36 and the first engaging piece 37, and a covering portion 33a which extends in the same manner from the molding portion 33 made of resin, and in which the extending piece 32a is buried. The second engaging piece 38 is formed as a portion of the molding portion 33 made of resin. The extending piece 36 and the first engaging piece 37 form a first bracket-side held portion 39a as a bracket-side held portion, and the extending piece 36 and the second engaging piece 38 form a second bracket-side held portion 39b as a bracket-side held portion.

In a fully closed state of the movable panel 12, since the upper surface of the first engaging piece 37 is in contact with the lower surface of the extending piece 28a, the upward movement of the first bracket-side held portion 39a is restricted, and since a lateral internal surface of the extending piece 36 is positioned close to a lateral external surface of the first sliding member-side holding portion 28, the first bracket-side held portion 39a is restricted from moving toward the inside of the vehicle. Similarly, since the upper surface of the second engaging piece 38 is positioned close to the lower surface of the extending piece 29c, the upward movement of the second bracket-side held portion 39b is restricted, and since a lateral external surface of the second engaging piece 38 is positioned close to a lateral internal surface of the body portion 29a, the second bracket-side held portion 39b is restricted from moving toward the outside of the vehicle. In addition, since the lower surface of the first engaging piece 37 is in contact with the upper surface of the first rail portion 13a, the downward movement of the first bracket-side held portion 39a is restricted. That is, the downward movement of the first bracket-side held portion 39a and the second bracket-side held portion 39b is restricted due to the guide rail 13.

As illustrated in FIG. 3, a front end surface of the first engaging piece 37 forms a bracket-side guide surface 37a that is inclined downward toward the front of the vehicle. As illustrated in FIGS. 4A and 4B, a substantially long circular column-shaped locking pin 33b, which extends toward the outside of the vehicle, is provided integrally with a front end portion of the molding portion 33 positioned further in front of the elevating guide pin 35 in the vehicle.

As illustrated in FIG. 3, while being adjacent to a lateral external portion of the support bracket 31, a slide check 41 made of resin is mounted on the guide rail 13 (the first rail portion 13a) in such a manner that the slide check 41 can move in the longitudinal direction. That is, the slide check 41 includes a shoe portion 42 which slides against a lateral external portion of the first rail portion 13a, and a vertical wall portion 43 which is erected upright between the support bracket 31 and the upper flange 13e in the lateral direction of the vehicle. When the shoe portion 42 slides against the lateral external portion of the first rail portion 13a, the slide check 41 can move along the guide rail 13 in the longitudinal direction.

As illustrated in FIGS. 4A and 4B, a long allowable hole 43a is formed in a front end portion of the vertical wall portion 43, and the locking pin 33b is movably inserted into the allowable hole 43a. The allowable hole 43a is straight inclined upward toward the rear of the vehicle. That is, the slide check 41 is connected to the support bracket 31 via the locking pin 33b inserted into the allowable hole 43a. When the locking pin 33b freely runs along the allowable hole 43a, the slide check 41 allows the movable panel 12 to be tilted (tilted upward or downward). The slide check 41 restricts the locking pin 33b (the support bracket 31) from moving in the allowable hole 43a in the longitudinal direction. Accordingly, when the slide check 41 moves in the longitudinal direction, the slide check 41 moves (slide) integrally with the movable panel 12 in the longitudinal direction, the movable panel 12 being supported by the support bracket 31.

The slide check 41 includes a substantially circular column-shaped support shaft 45, the center line of which extends in the longitudinal direction, and which is non-turnable and protrudes toward the rear of the vehicle. A substantially annular rotating check 46 is supported by a front end portion of the support shaft 45 while being adjacent to the slide check 41. The rotating check 46 along with the slide check 41, the guide block 60, and the like forms a well-known check mechanism 40. For example, when the driving shoe 21 moves toward the front of the vehicle in the fully closed state of the movable panel 12, the longitudinal movement of the rotating check 46 is restricted due to engagement between the rotating check 46 and the guide block 60, and the turning of the rotating check 46 is restricted due to engagement between the rotating check 46 and the driving shoe 21. Accordingly, the longitudinal movement of the rotating check 46 and the slide check 41 is restricted, and the longitudinal movement of the support bracket 31 is also restricted, the support bracket 31 being connected to the slide check 41 via the allowable hole 43a and the like. As a result, the movable panel 12 is allowed to transition only from the fully closed state to the tilted up state.

When the engageable insertion concave portion 23a reaches the rotating check 46 as the driving shoe 21 moves toward the front of the vehicle, the restriction of turning by the driving shoe 21 is released. In this state, when the driving shoe 21 and the rotating check 46 move to the rear of the vehicle, the rotating check 46 turns while being guided by the guide block 60, and thus the engagement between the rotating check 46 and the guide block 60 is released, and the turning of the rotating check 46 is re-restricted due to engagement between the rotating check 46 and the guide rail 13 (guide portion 18). Accordingly, the restriction of the longitudinal movement of the rotating check 46 and the slide check 41 is released, and the restriction of the longitudinal movement of the support bracket 31 is also released, the support bracket 31 being connected to the slide check 41 via the allowable hole 43a and the like. At this time, a portion of the rotating check 46 is disposed on a longitudinal movement track on the inside wall surface of the engageable insertion concave portion 23a.

A rotating cam 51 made of resin is supported by a rear end portion of the support shaft 45. In contrast, the driving shoe 21 includes a fixed cam 52 made of resin that is installed coaxially with the rotating cam 51 at the rear (behind the rotating cam 51) of the vehicle. The fixed cam 52 is separated from the rotating cam 51 when the driving shoe 21 is present at a position in which the movable panel 12 transitions at least from the fully closed state to the first tilted up state. The fixed cam 52 overlaps the rotating cam 51 in the longitudinal direction when the driving shoe 21 is present at a position in which the movable panel 12 transitions at least from the first tilted up state to the second tilted up state. The rotating cam 51 and the fixed cam 52 form a well-known engaging and disengaging switch mechanism 50. The engaging and disengaging switch mechanism 50 switches a disengaged state of the rotating cam 51 and the fixed cam 52 to an engaged state, or switches an engaged state of the rotating cam 51 and the fixed cam 52 to a disengaged state, using a pressing operation between the rotating cam 51 and the fixed cam 52.

In this configuration, for example, in the fully closed state of the movable panel 12, when the driving shoe 21 moves toward the front of the vehicle relative to the support bracket 31 by the predetermined distance, the locking pin 33b freely runs along the allowable hole 43a while moving upward along the allowable hole 43a of the slide check 41, and the elevating guide pin 35 moves upward along the guide groove 22a and reaches the intermediate portion of the guide groove 22a. Accordingly, the movable panel 12 transitions to the first tilted up state.

As described above, when the driving shoe 21 is present at the position in which the movable panel 12 transitions at least from the fully closed state to the first tilted up state, the rotating cam 51 and the fixed cam 52 of the engaging and disengaging switch mechanism 50 are separated from each other in the longitudinal direction (disengaged state of the rotating cam 51 and the fixed cam 52). Accordingly, when the driving shoe 21 moves to the rear of the vehicle in the first tilted up state of the movable panel 12, the locking pin 33b freely runs along the allowable hole 43a while moving downward along the allowable hole 43a of the slide check 41, and the elevating guide pin 35 moves downward along the guide groove 22a and reaches a dead end of the guide groove 22a. As a result, the movable panel 12 is tilted downward such that the front portions of the support brackets 31 pivotally move downward relative to the rear portions, and the movable panel 12 transitions to the fully closed state.

In contrast, when the driving shoe 21 moves further toward the front of the vehicle relative to the support bracket 31 in the first tilted up state of the movable panel 12, the locking pin 33b freely runs along the allowable hole 43a while moving further upward along the allowable hole 43a of the slide check 41, and the elevating guide pin 35 moves upward along the guide groove 22a and reaches the dead end of the guide groove 22a. Accordingly, the movable panel 12 transitions to the second tilted up state. When the engageable insertion concave portion 23a reaches the rotating check 46 along with the movement of the driving shoe 21 toward the front of the vehicle, the rotating check 46 is allowed to turn.

At this time, as described above, the rotating cam 51 and the fixed cam 52 of the engaging and disengaging switch mechanism 50 overlap each other in the longitudinal direction. Thereafter, when the driving shoe 21 along with the fixed cam 52 moves toward the rear of the vehicle, the rotating cam 51 is engaged with the fixed cam 52 due to the pressing operation therebetween, and the slide check 41 and the rotating check 46 along with the rotating cam 51 move toward the rear of the vehicle being like an integrated element. The rotating check 46 (allowed to turn) turns in the engageable insertion concave portion 23a while being guided by the guide block 60, engagement between the rotating check 46 and the guide block 60 is released, and the turning of the rotating check 46 is re-restricted due to engagement between the rotating check 46 and the guide rail 13 (the guide portion 18). Accordingly, the restriction of the movement of the slide check 41 toward the rear of the vehicle is released, and the restriction of the movement of the support bracket 31 toward the rear of the vehicle is released, the support bracket 31 being connected to the slide check 41 via the allowable hole 43a and the like. At the same time, a portion of the rotating check 46 enters the engageable insertion concave portion 23a, and is disposed on the longitudinal movement track on the inside wall surface of the engageable insertion concave portion 23a.

Accordingly, when the driving shoe 21 moves toward the rear of the vehicle, the slide check 41 along with the support bracket 31 and the rotating check 46 moves toward the rear of the vehicle being like an integrated element via the rotating cam 51 and the fixed cam 52 which are engaged together. At this time, the movable panel 12 supported by the support brackets 31 moves toward the rear of the vehicle while being in the second tilted up state, and the opening 10a is opened. Accordingly, the movable panel 12 is in an open state.

When the movable panel 12 is in the open state, as described above, the rotating check 46 is engaged with the guide rail 13 (the guide portion 18), and the turning of the rotating check 46 is restricted. A portion of the rotating check 46 is disposed on the longitudinal movement track on the inside wall surface of the engageable insertion concave portion 23a. Accordingly, in this state, when the driving shoe 21 moves toward the front of the vehicle, the inside wall surface of the engageable insertion concave portion 23a presses the rotating check 46, and thus the rotating check 46 along with the slide check 41 and the support bracket 31 moves toward the front of the vehicle being like an integrated element. At this time, the movable panel 12 supported by the support brackets 31 moves toward the front of the vehicle while being in the second tilted up state, and the opening 10a is closed.

When the movable panel 12 approaches an original state before transitioning to the second tilted up state, due to the closing operation of the movable panel 12, the rotating check 46 turns while being guided by the guide block 60, and is engaged with the guide block 60 and the driving shoe 21, and thus the turning of the rotating check 46 is re-restricted. Accordingly, the longitudinal movement of the rotating check 46 along with the slide check 41 and the support bracket 31 is restricted.

When the driving shoe 21 moves further toward the front of the vehicle in this state, the fixed cam 52 moves further toward the front of the vehicle relative to the rotating cam 51 that is restricted from moving in the longitudinal direction along with the slide check 41. Thereafter, when the driving shoe 21 moves toward the rear of the vehicle, the rotating cam 51 is disengaged from the fixed cam 52 due to the pressing operation therebetween, and the driving shoe 21 along with the fixed cam 52 moves toward the rear of the vehicle while the rotating check 46, the slide check 41, and the rotating cam 51 are left behind.

At this time, the locking pin 33b freely runs along the allowable hole 43a while moving downward along the allowable hole 43a of the slide check 41, and the elevating guide pin 35 moves downward along the guide groove 22a, and reaches the dead end of the guide groove 22a. As a result, the movable panel 12 is tilted downward, and transitions to a fully closed state via the first tilted up state.

Subsequently, an operation of the embodiment is described.

Since the front shoe portion 24, the intermediate shoe portion 25, and the rear shoe portion 26 are held by the first rail-side holding portion 17 and the second rail-side holding portion 18 in such a manner as not to be able to move in the lateral direction and the vertical direction of the vehicle, both sides of the driving shoe 21 are more firmly held relative to the guide rail 13 by the first rail-side holding portion 17 and the second rail-side holding portion 18. When the movable panel 12 is in the fully closed state, the first bracket-side held portion 39a and the second bracket-side held portion 39b are held by the first sliding member-side holding portion 28 and the second sliding member-side holding portion 29 in such a manner as not to be able to move in the lateral direction and the vertical direction of the vehicle, and thus both sides of the support bracket 31 are more firmly held relative to the driving shoe 21 by the first sliding member-side holding portion 28 and the second sliding member-side holding portion 29. Accordingly, even if a large load is applied to the fully closed movable panel 12 from the vehicle's passenger compartment due to a vehicle rolling over or the like, the support bracket 31 is prevented from being twisted.

Figure 8A:
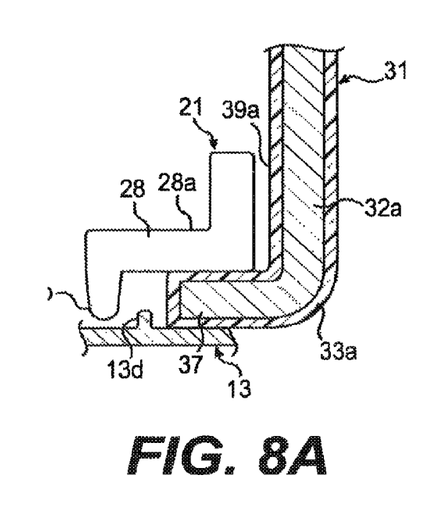
FIGS. 8A and 8B are schematic views illustrating an operation in the embodiment.
Figure 8B:
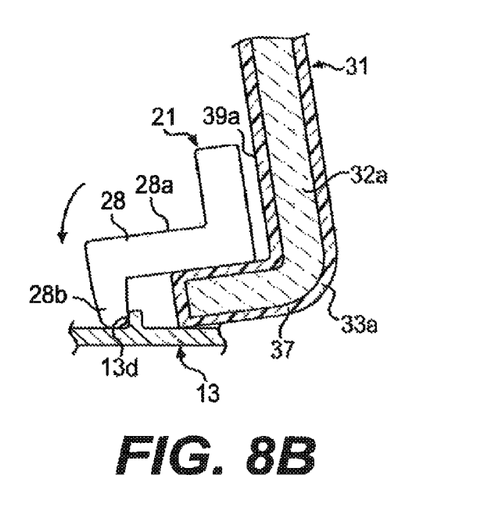

As schematically illustrated in FIGS. 8A and 8B, when the support bracket 31 is twisted in a direction (in a counterclockwise direction in FIGS. 8A and 8B) due to a vehicle rolling over or the like, the driving shoe 21 is also twisted, which supports the first bracket-side held portion 39a (the support bracket 31) via the first sliding member-side holding portion 28. Since the extending piece 32a made of metal is buried in the first bracket-side held portion 39a, the support bracket 31 is more prominently twisted. At this time, both the restricting pieces 28b are engaged with the rib 13d that is positioned ahead of the restricting pieces 28b in a twisting direction of the support bracket 31 and the like, and thus the twisting of the driving shoe 21 is restricted.

As described above, in the embodiment, it is possible to obtain the following effects.

(1) In the embodiment, even if a large load is applied to the fully closed movable panel 12 from the vehicle's passenger compartment due to a vehicle rolling over or the like, it is possible to prevent the support bracket 31 from being twisted, and to keep the support bracket 31 in a more stable position.

(2) In the embodiment, since both the restricting pieces 28b are engaged with the rib 13d that is positioned ahead of the restricting pieces 28b in the twisting direction of the support bracket 31 and the like, when a large load is applied to the fully closed movable panel 12 from the vehicle's passenger compartment due to a vehicle rolling over or the like, it is possible to restrict the twisting of the driving shoe 21. In addition, it is possible to keep the support bracket 31, supported by the driving shoe 21, in a more stable position.

(3) In the embodiment, in the fully closed state of the movable panel 12, since the second bracket-side held portion 39b is positioned close to the second sliding member-side holding portion 29 in the vertical direction of the vehicle, that is, the second bracket-side held portion 39b is not in contact with the second sliding member-side holding portion 29, it is possible to reduce sliding resistance more when the driving shoe 21 starts to move in a state where the movable panel 12 is fully closed. When a light load is applied to the movable panel 12 from the vehicle's passenger compartment (from below the movable panel 12), for example, when the head of a passenger comes into contact with the movable panel 12, it is possible to prevent the twisting of the support bracket 31 by virtue of the first bracket-side held portion 39a that is in contact with the first sliding member-side holding portion 28. In contrast, when a large bad is applied to the fully closed movable panel 12 from the vehicle's passenger compartment due to a vehicle rolling over or the like, and the support bracket 31 is twisted, the second bracket-side held portion 39b comes into contact with the second sliding member-side holding portion 29 in the vertical direction of the vehicle. Therefore, it is possible to prevent the twisting of the support bracket 31 by virtue of collaboration between the second bracket-side held portion 39b and the first bracket-side held portion 39a. Accordingly, it is possible to appropriately ensure rigidity against the twisting of the support bracket 31 while reducing the sliding resistance of the driving shoe 21.

(4) In the embodiment, when the movable panel 12 transitions to the fully closed state while being tilted downward, the first engaging piece 37 of the support bracket 31 gradually moves downward. In contrast, the first sliding member-side holding portion 28 of the driving shoe 21 gradually moves toward the rear of the vehicle. Accordingly, for example, even if air resistance causes the movable panel 12 (the support bracket 31) to flap while the vehicle is travelling at a high speed, since the first engaging piece 37 enters a region below the first sliding member-side holding portion 28, it is possible to smoothly pull the movable panel 12 into the fully closed state.

(5) In the embodiment, when the movable panel 12 transitions to the fully closed state while being tilted downward, even if the rear end surface of the driving shoe 21 interferes with the first engaging piece 37 of the support bracket 31, the sliding member-side guide surface 22b and the bracket-side guide surface 37a can guide the first engaging piece 37 into a region below the first sliding member-side holding portion 28. Accordingly, the movable panel 12 can be more reliably pulled into the fully closed state, or thereafter, the first sliding member-side holding portion 28 can more reliably hold the first bracket-side held portion 39a.

(6) In the embodiment, in the fully closed state of the movable panel 12, when the driving shoe 21 moves toward the front of the vehicle, the movable panel 12 transitions to a tilted up state. That is, the driving shoe 21 is disposed close to the rear of the vehicle in the fully closed state of the movable panel 12, while the movement of the driving shoe 21 to the front of the vehicle is taken into consideration. Accordingly, the first sliding member-side holding portion 28 and the second sliding member-side holding portion 29 for holding the movable panel 12 in the fully closed state can be provided in the driving shoe 21 even if the driving shoe 21 does not extend further toward the rear of the vehicle.

(7) In the embodiment, since the first sliding member-side holding portion 28 for pulling the movable panel 12 into the fully closed state is provided integrally with the driving shoe 21, it is possible to reduce the number of components compared to a case in which a dedicated component (rear link or the like) is provided so as to pull the movable panel 12 into the fully closed state.

The embodiment may be changed in the following manner.

In the embodiment, insofar as the operations of the driving shoe 21 and the support bracket 31 are not disturbed, when the movable panel 12 transitions to the fully closed state while being tilted downward, the sliding member-side guide surface (22b) of the driving shoe 21 may guide the second sliding member-side holding portion 29 to hold the second bracket-side held portion 39b while holding the second bracket-side held portion 39b.

In the embodiment, insofar as the driving shoe 21 is disposed outside of the support bracket 31 in the lateral direction of the vehicle, when the movable panel 12 transitions to the fully closed state while being tilted downward, the second sliding member-side holding portion 29 may be guided to hold the second bracket-side held portion 39b by the sliding member-side guide surface 22b of the driving shoe 21. In this case, the second sliding member-side holding portion 29 is not guided to hold the second bracket-side held portion 39b by the sliding member-side guide surface 22b of the driving shoe 21.

In the embodiment, the sliding member-side guide surface 22b of the driving shoe 21 may be omitted.

In the embodiment, in replacement of or in addition to the bracket-side guide surface 37a, a bracket-side guide surface may be formed in a front end surface of the second engaging piece 38 such that this bracket-side guide surface is inclined downward toward the front of the vehicle, in this case, when the movable panel 12 transitions to the fully closed state while being tilted downward, even if a rear and surface of the extending piece 29c interferes with the second engaging piece 38 of the support bracket 31, this bracket-side guide surface can guide the second engaging piece 38 into a region below the extending piece 29c. Accordingly, in the fully closed state of the movable panel 12, the second sliding member-side holding portion 29 can more reliably hold the second bracket-side held portion 39b.

In the embodiment, the bracket-side guide surface 37a of the first engaging piece 37 (the first bracket-side held portion 39a) may be omitted.

In the embodiment, when the movable panel 12 is in the fully closed state, the upper surface of the first engaging piece 37 may be positioned close to (is not in contact with) the lower surface of the extending piece 28a such that the upward movement of the first bracket-side held portion 39a is restricted. The lateral internal surface of the extending piece 36 may be in contact with the lateral external surface of the first sliding member-side holding portion 28 such that the first bracket-side held portion 39a is restricted from moving toward the inside of the vehicle.

In the embodiment, when the movable panel 12 is in the fully closed state, the lower surface of the first engaging piece 37 may be positioned close to (is not in contact with) the upper surface of the first rail portion 13a such that the downward movement of the first bracket-side held portion 39a is restricted.

In the embodiment, if the first sliding member-side holding portion 28 is molded in such a manner as to be positioned below the first engaging piece 37, in the fully closed state of the movable panel 12, the lower surface of the first engaging piece 37 may be in contact with or is positioned close to the first sliding member-side holding portion 28 such that the downward movement of the first bracket-side held portion 39a is restricted.

In the embodiment, when the movable panel 12 is in the fully closed state, the upper surface of the second engaging piece 38 may be in contact with the lower surface of the extending piece 29c such that the upward movement of the second bracket-side held portion 39b is restricted. The lateral external surface of the second engaging piece 38 may be in contact with the lateral internal surface of the body portion 29a such that the second bracket-side held portion 39b is restricted from moving toward the inside of the vehicle.

In the embodiment, when the movable panel 12 is in the fully closed state, the lower surface of the second engaging piece 38 may be in contact with the upper surface of the first rail portion 13a such that the downward movement of the second bracket-side held portion 39b is restricted.

In the embodiment, if the second sliding member-side holding portion 29 is molded in such a manner as to be positioned below the second engaging piece 38, in the fully closed state of the movable panel 12, the lower surface of the second engaging piece 38 may be in contact with or is positioned close to the second sliding member-side holding portion 29 such that the downward movement of the second bracket-side held portion 39b is restricted.

In the embodiment, the restricting piece may be disposed at an arbitrary position other than the first sliding member-side holding portion 28 of the driving shoe 21 insofar as the restricting piece can be engaged with the rib 13d in the twisting direction of the support bracket 31.

In the embodiment, insofar as the restricting piece (28b) can be engaged with the rib (13d) in the twisting direction of the support bracket 31, the restricting piece (28b) and the rib (13d) may be disposed at arbitrary positions on the driving shoe 21 and the first rail-side holding portion 17. For example, the restricting piece may extend upward from the extending piece 28a, and the rib may protrude from the first rail-side holding portion 17 in such a manner as to be positioned ahead of the restricting piece in the twisting direction of the support bracket 31 and the like.

In the embodiment, the second rail-side holding portion 18 and the driving shoe 21 may be respectively provided with the rib and the restricting piece which can be engaged with each other in the twisting direction of the support bracket 31.

In the embodiment, the shape of the restricting piece 28b is illustrated as an example, and for example, the restricting piece 28b may have the shape of a spindle such as a cone, or the shape of a column such as a circular column.

In the embodiment, the number of restricting pieces 28b is arbitrarily given. The restricting piece 28b may be omitted.

In the embodiment, the movable panel 12 is tilted upward at two stages: the first tilted up state, and the second tilted up state in which the movable panel 12 is tilted further upward than the first tilted up state. In contrast, the position of the movable panel 12 in the original tilted up state, to which the movable panel 12 transitions from the fully closed state, may coincide with the position of the movable panel 12 in a tilted up state when the movable panel 12 slides along the guide rails 13.

In the embodiment, a connection mode for connecting the driving shoe 21 to the support bracket 31 (the movable panel 12) is illustrated as an example. For example, a guide groove may be formed in the support bracket 31 (the vertical wall portion 32) in the opposite direction to a direction in which the guide groove 22a is formed, and an elevating guide pin may be fixedly attached to the driving shoe 21, the elevating guide pin being engageably and movably inserted into the guide groove.

The second sliding member-side holding portion 29 and the second bracket-side held portion 39b may be omitted, and only one side of the support bracket 31 may be held relative to the driving shoe 21 by the first sliding member-side holding portion 28 and the first bracket-side held portion 39a. Alternatively, the first sliding member-side holding portion 28 and the first bracket-side held portion 39a may be omitted, and only one side of the support bracket 31 may be held relative to the driving shoe 21 by the second sliding member-side holding portion 29 and the second bracket-side held portion 39b.

Subsequently, technical ideas which can be known from the embodiment and other examples are additionally described.

An aspect of the disclosure is directed to a sunroof apparatus including: a movable panel that can open or close an opening formed in the roof of a vehicle; guide rails that have a pair of rail-side holding portions provided side by side in a lateral direction of the vehicle, and are respectively provided in both edge portions of the opening in the lateral direction of the vehicle; support brackets, front end portions of which are supported by the guide rails, which have vertical walls for supporting both edge portions of the movable panel in the lateral direction of the vehicle, and each of which has a pair of bracket-side held portions provided on both sides of a rear end portion of the vertical wall in the lateral direction of the vehicle; sliding members which are provided so as to be able to move along the guide rails, and each of which has a connection wall connected to the support bracket; a pair of sliding member-side held portions that is provided on both sides of the connection wall in the lateral direction of the vehicle, and is held by both the rail-side holding portions such that both the sliding member-side held portions cannot move in the lateral direction and a vertical direction of the vehicle; and a pair of sliding member-side holding portions that is provided side by side in a rear end portion of the connection wall in the lateral direction of the vehicle, and holds both the bracket-side held portions such that both the bracket-side held portions cannot move in the lateral direction and the vertical direction of the vehicle when the movable panel is in a fully closed state; and an electric driving source that drives the movement of the sliding members.

In this configuration, since both the sliding member-side held portions are held by both the rail-side holding portions such that both the sliding member-side held portions cannot move in the lateral direction and the vertical direction of the vehicle, the sliding member is held relative to the guide rail while being held by both the rail-side holding portions. In addition, since both the bracket-side held portions are held by both the sliding member-side holding portions such that both the bracket-side held portions cannot move in the lateral direction and the vertical direction of the vehicle when the movable panel is in the fully closed state, the support bracket is held relative to the sliding member while being held by both the sliding member-side holding portions. Accordingly, even if a large load is applied to the fully closed movable panel from a vehicle's passenger compartment due to a vehicle rolling over or the like, it is possible to prevent the support bracket from being twisted, and to keep the support bracket in a more stable position.

In the sunroof apparatus according to the aspect of this disclosure, it is preferable that a rib protrudes from at least one of both the rail-side holding portions in such a manner as to extend in a longitudinal direction of the vehicle, and a restricting piece protrudes from each of the sliding members such that the restricting piece can be engaged with the rib in a twisting direction of the support bracket.

In this configuration, when a large load is applied to the fully closed movable panel from the vehicle's passenger compartment due to a vehicle rolling over or the like, and the support bracket is twisted, the sliding member is also twisted, which supports the support bracket. At this time, since the restricting piece is engaged with the rib positioned ahead of the restricting piece in the twisting direction of the support bracket, it is possible to restrict the twisting of the sliding member.

In the sunroof apparatus according to the aspect of this disclosure, it is preferable that, when the movable panel is in the fully closed state, a first bracket-side held portion, which is one of both the bracket-side held portions, is in contact with the sliding member-side holding portion in the vertical direction of the vehicle, and when the movable panel is in the fully closed state, a second bracket-side held portion, which is the other of both the bracket-side held portions, is positioned close to the sliding member-side holding portion in the vertical direction of the vehicle.

In this configuration, in the fully closed state of the movable panel, since the second bracket-side held portion is positioned close to the sliding member-side holding portion in the vertical direction of the vehicle, that is, the second bracket-side held portion is not in contact with the sliding member-side holding portion, it is possible to more reduce sliding resistance when the sliding member starts to move in a state where the movable panel is fully closed. In contrast, when a large load is applied to the fully closed movable panel from the vehicle's passenger compartment due to a vehicle rolling over or the like, and the support bracket is twisted, the second bracket-side held portion comes into contact with the sliding member-side holding portion in the vertical direction of the vehicle. Therefore, it is possible to prevent the twisting of the support bracket by virtue of collaboration between the second bracket-side held portion and the first bracket-side held portion. Accordingly, it is possible to appropriately ensure rigidity against the twisting of the support bracket while reducing the sliding resistance of the sliding member.

In the sunroof apparatus according to the aspect of this disclosure, it is preferable that the bracket-side guide surface is formed in at least one of both the bracket-side held portions such that the sliding member-side holding portion is guided to hold the bracket-side held portion by the bracket-side guide surface when the movable panel transitions to the fully closed state while being tilted downward.

In this configuration, by virtue of the guide of the bracket-side guide surface, the sliding member-side holding portion can more reliably hold the bracket-side held portion when the movable panel transitions to the fully closed state while being tilted downward.

In the sunroof apparatus according to the aspect of this disclosure, it is preferable that the sliding member-side guide surface is formed at the rear end of the sliding member such that the sliding member-side holding portion is guided to hold at least one of both the bracket-side held portions by the sliding member-side guide surface when the movable panel transitions to the fully closed state while being tilted downward.

In this configuration, by virtue of the guide of the sliding member-side guide surface, the sliding member-side holding portion can more reliably hold the bracket-side held portion when the movable panel transitions to the fully closed state while being tilted downward.

According to the aspect of this disclosure, it is possible to keep support brackets in a more stable position even if a load is applied to a movable panel from a vehicle's passenger compartment.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A sunroof apparatus comprising:
 a movable panel that is configured to open or close an opening formed in a roof of a vehicle;
 guide rails that have a pair of rail-side holding portions provided side by side in a lateral direction of the vehicle, and are respectively provided in both edge portions of the opening in the lateral direction of the vehicle;
 support brackets, front end portions of which are supported by the guide rails, each of the support brackets including a vertical wall for supporting a respective edge portion of the movable panel in the lateral direction of the vehicle, and each of the support brackets including a pair of bracket-side held portions provided on both sides of a rear end portion of the vertical wall in the lateral direction of the vehicle;
 sliding members which are provided so as to be able to move only in the longitudinal direction of the vehicle along the guide rails, and each of which has a connection wall connected to the support bracket;
 a pair of sliding member-side held portions that is provided on both sides of the connection wall in the lateral direction of the vehicle, and is held by both the rail-side holding portions such that both the sliding member-side held portions cannot move in the lateral direction and a vertical direction of the vehicle;
 a pair of sliding member-side holding portions that is provided side by side in a rear end portion of the connection wall in the lateral direction of the vehicle, and holds both the bracket-side held portions such that both the bracket-side held portions cannot move in the lateral direction and the vertical direction of the vehicle when the movable panel is in a fully closed state; and
 an electric driving source that drives the movement of the sliding members,
 wherein a rib protrudes from at least one of both the rail-side holding portions in such a manner as to extend in a longitudinal direction of the vehicle, and wherein a restricting piece protrudes from each of the sliding members such that the restricting piece can be engaged with the rib in a twisting direction of the support bracket.

2. The sunroof apparatus according to claim 1, wherein the bracket-side held portions define a first bracket-side held portion and a second bracket-side held portion, wherein when the movable panel is in the fully closed state, the first bracket-side held portion is in contact with the sliding member-side holding portion in the vertical direction of the vehicle, and wherein when the movable panel is in the fully closed state, the second bracket-side held portion is positioned close to the sliding member-side holding portion in the vertical direction of the vehicle.

* * * * *